United States Patent [19]

Hartmann

[11] 4,038,004
[45] July 26, 1977

[54] MEASUREMENT APPARATUS FOR DETERMINING THE DEGREE OF FILLING OF A CASTING MOLD

[75] Inventor: Eduard Hartmann, Urdorf, Switzerland

[73] Assignee: Bucher-Guyer AG Maschinenfabrik, Niederweningen, Switzerland

[21] Appl. No.: 599,880

[22] Filed: July 28, 1975

[30] Foreign Application Priority Data

Aug. 7, 1974   Switzerland .................. 10806/74

[51] Int. Cl.² ............................................. B29F 1/06
[52] U.S. Cl. ................................ 425/150; 324/71 R; 425/140; 425/170
[58] Field of Search .............. 425/140, 141, 150, 149, 425/170, 171; 324/71 R

[56] References Cited

U.S. PATENT DOCUMENTS

| 2,025,719 | 12/1935 | Blau et al. | 324/71 R |
| 2,420,148 | 6/1947 | Ostergren | 324/71 R |
| 3,534,442 | 10/1970 | Mahle | 425/170 |
| 3,825,386 | 7/1974 | Bello et al. | 425/150 |

FOREIGN PATENT DOCUMENTS

| 288,197 | 1/1953 | Switzerland | 324/71 R |
| 906,762 | 9/1962 | United Kingdom | 425/149 |

Primary Examiner—Francis S. Husar
Assistant Examiner—William R. Briggs
Attorney, Agent, or Firm—Werner W. Kleeman

[57] ABSTRACT

A measurement apparatus for use with a molding machine comprising an electrical measurement value transmitter responsive to distance variations for determining the degree of filling of a casting mold, the mold parts of which are supported against one another in the closed position of the mold by means of at least one fluid-operated, for instance, hydraulic displacement device incorporating a closure cylinder and closure piston. One transmitter component of the electrical measurement value transmitter is operatively coupled with the closure cylinder and a second transmitter component of the measurement value transmitter is operatively coupled with the closure piston.

11 Claims, 3 Drawing Figures

MEASUREMENT APPARATUS FOR DETERMINING THE DEGREE OF FILLING OF A CASTING MOLD

BACKGROUND OF THE INVENTION

The present invention relates to a new and improved construction of measurement apparatus for determining the degree of filling of a casting mold — also conveniently simply referred to as a mold —, having mold halves or parts which are supported against one another, against the action of a molding mass or material filled under pressure into a molding compartment or cavity of the mold, by means of a displacement device embodying a closure device comprising a closure cylinder and a closure piston.

It is already known to the art in the case of injection molding machines for processing plastic materials which can be plasticized, to automatically regulate parameters influencing the degree of filling of the mold, such as for instance the injection pressure, the after-pressure, the dosing volume or the setting time of the injected material, as a function of the relative movement occurring between the two mold halves which is in the sense of opening the mold due to the action of the pressure of the injected mass of material during the injection molding operation. It has already been proposed to arrange measurement or measuring devices at the mold, which devices sense the changes in shape or position of the mold brought about by the pressure of the injection molding material in the form of a signal value or amplitude. Measuring devices of this type are associated with a number of different drawbacks. What should be readily apparent is especially the disadvantage that each time the mold must be replaced it is equally necessary to exchange the measurement device together with the mold, and thus, sensitive components of such measurement device are exposed to the danger of damage. There can be however also provided for each mold a separate measurement device, but such is associated with considerable additional costs.

Furthermore, it has been found in the case of measurement devices which are arranged at the mold the measurement operation is exposed to disturbance factors which falsify the measurement result and lead to disturbances in the regulating function. Thus, for instance, the measurement operation can be influenced by the thermal energy transmitted from the heated mold to the measurement device.

Disturbance factors also have been then ascertained when the measurement device is arranged at one of both mold clamping or mounting plates because the bending-through of such mold mounting plates — and which bending-through arises under the action of the closing pressure of the mold — influences the measurement result.

SUMMARY OF THE INVENTION

Hence, it is a primary object of the present invention to provide a new and improved construction of measurement apparatus for determining the degree of filling of a mold which is not associated with the aforementioned drawbacks and limitations of the prior art proposals.

Further, in consideration of the aforementioned drawbacks, it is an additional noteworthy objective of the present invention to carry out the measurements for determining the degree of filling of the mold, independently of the exchange of the mold, by means of a measurement device which continuously remains at the molding machine, leding to the beneficial result that the disturbance factors which arise at the region of the mold do not effect the measurement results.

Yet a further object of the present invention aims at the provision of a new and improved construction of measurement apparatus for determining the degree of filling of a mold, said measurement apparatus being structured and oriented such that it need not be replaced each time that the mold is exchanged, rather remains affixed to the molding machine, and disposed at a location where it is not exposed to disturbances or other factors which could produce spurious measurement results.

Now in order to implement these and still further objects of the invention, which will become more readily apparent as the description proceeds, the measurement apparatus of this development is manifested by the features that there is provided a measurement value transmitter responsive to the relative position of the closure piston which is movable to a limited degree with respect to the closure cylinder, wherein a first transmitter component or part of the measurement value transmitter is connected to the closure cylinder and a second transmitter component or part is connected with the closure piston. According to a preferred arrangement of the measurement value transmitter, a first transmitter component is secured to a cylinder flange and a second transmitter component is coupled with a piston neck or rod of the closure piston, this coupling advantageously occurring in a force-locking manner, in other words for instance, frictionally or drag connected.

BRIEF DESCRIPTION OF THE DRAWINGS

The invention will be better understood and objects other than those set forth above, will become apparent when consideration is given to the following detailed description thereof. Such description makes reference to the annexed drawings on the basis of which the invention will be explained in conjunction with four exemplary embodiments illustrated in the drawings and wherein:

FIG. 3 is a view similar to the showing of FIG. 2 of a measurement device employing wire strain gauges or the like.

DETAILED DESCRIPTION OF THE PREFERRED EMBODIMENTS

Figure 1:
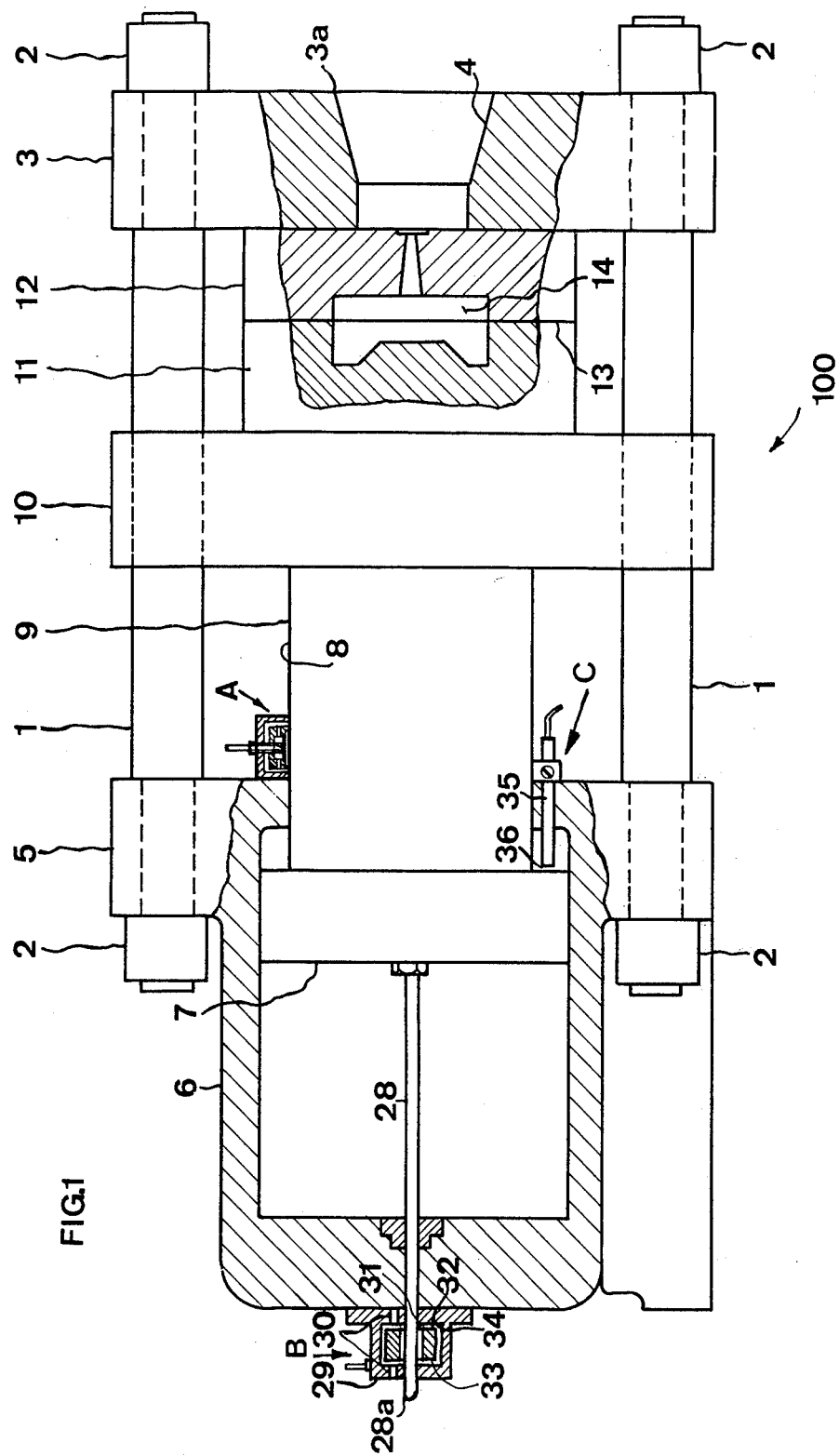
FIG. 1 illustrates a contactless measurement feeler shown in three different arrangements at a closure unit or device of an injection molding machine illustrated in side view.

Describing now the drawings, it is to be first of all understood that only enough of the details of the molding machine, with which there is employed the measurement apparatus of this development for determining the degree of filling of a mold thereof, has been shown in order to enable those skilled in the art to readily understand the basic concepts and underlying principles of the present invention. Hence, there is shown in FIG. 1 an injection molding machine, generally indicated by reference character 100, wherein at a mold closure unit thereof for closing the mold 11, 12 a stationary mold mounting plate 3 is anchored at the columns 1 by means of nut members 2 or equivalent structure. The mold mounting or clamping plate 3 is appropriately interrupted at location 3a to form a pour opening 4 for the introduction of a not particularly illustrated but conventional injection cylinder, as is well known in this particular field of technology. With the aid of for instance identical nut members 2 or equivalent structure a closure cylinder 6 is secured by means of its cylinder flange or flange means 5 at the other end of the columns 1.

A closure piston 9 is mounted to be axially displaceable within the closure cylinder 6. This closure piston 9 can be conventionally impinged by a suitable fluid medium, typically an hydraulic medium such as oil. Closure piston 9 will be seen to comprise for example a piston head 7 and a piston neck or rod 8 or the like. The closure piston 9 and a movable mold mounting plate 10 form as a rigid unit the movable portion of a displacement device which also embodies the closure cylinder 6. Hence, the displacement device may be considered to comprise the closure cylinder 6 and the therein mounted closure piston 9 together with the movable mold mounting plate 10. The mold mounting plates 10 and 3 each carry one respective mold part or half 11 and 12 these mold halves 11 and 12, when the mold 11, 12 is closed, enclosing a mold compartment or cavity 14 at the region of a mold separation plane 13.

Figure 2:
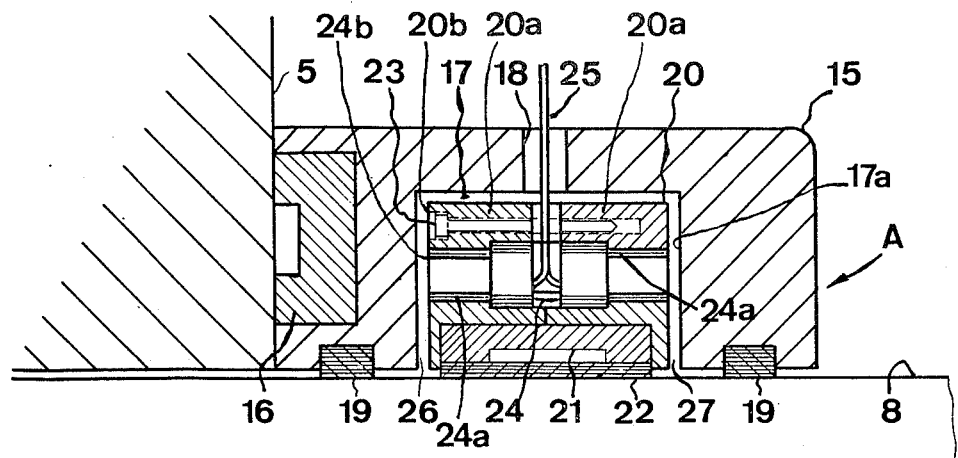
FIG. 2 is an enlarged view showing details of one of the measurement feeler-arrangements portrayed in FIG. 1

For the injection molding machine portrayed in FIG. 1 there have been shown three different arrangements of measurement value transmitters A, B, and C. Initially, with respect to FIG. 2 there will be considered the measurement value transmitter A which comprises a transmitter component or part 15 which is connected by means of a permanent magnet 16 with the cylinder flange 5 of the closure cylinder 6. This transmitter component 15 which is provided with a recess 17 and a bore 18 carries at its underside two seals 19. A second transmitter component or part 20 is inserted with lateral play into the recess 17 of the first transmitter component 15 and adheres by means of a permanent magnet 21 at the piston neck 8, a sliding sole or base 22 formed of a material having good sliding or antifriction properties being interposed between the permanent magnet 21 and the piston neck 8. The transmitter component 20 which is assembled together from two halves 20a by means of screws 23 or other suitable fastening expedients houses therein an inductive measurement feeler 24 composed of the measurement coils 24a. The measurement feeler 24 is a conventional commercially available measurement feeler and both of the measurement coils 24a form one-half of a Wheatstone bridge. These measurement coils 24a are augmented by standard resistors, which have not been particularly illustrated, into a full measuring bridge at a not particularly illustrated measurement amplifier which is connected via a measurement line or conductor 25 with the measurement feeler 24. The measurement coils 24a are advantageously flush at their end faces 24b with the side walls 20b of the transmitter component 20, as shown. The pick-up of the signal representing the measurement value occurs in such a manner that the apparent resistance or image impedance of the measurement coils 24a is influenced by changing two measurement gaps or spaces 26 and 27 formed by the end faces 24b of the measurement coils 24a and the side walls 17a of the recess 17, and thus there occurs a relatively small detuning of the balanced bridge circuit. At the output of the bridge circuit there appears a measurement voltage which is proportional to the small bridge detuning or imbalance which can be linearly amplified a number of times in a standard measurement amplifier and rectified in such a manner that a voltage serving as a regulation magnitude can be delivered to a conventional indicating- or regulation device. To simplify the illustration of the drawings the resistors or equivalent structure completing the Wheatstone bridge, the measurement amplifier, the indicator- or regulation device have not been particularly shown since the same constitute standard components and the details thereof are not considered important to the understanding of the principles of the invention by those skilled in the art beyond what has been explained above.

Prior to the injection molding operation the mold half 11 is brought into contact at the mold separation plane 13 with the mold half 12 due to the displacement movement or stroke of the closure piston 9 and is held in the mold closure or closed position with a predetermined, constant holding force. The force of the magnet 21 is dimensioned such that with the displacement of the closure piston 9 the piston neck 8 thereof initially displaces the transmitter component 20 until it impacts against the right-hand side of the transmitter component 15 and thereafter upon nullifying the measurement gap 27 allows such transmitter component 20 to remain at rest.

During the subsequent injection molding operation in the terminal phase of filling of the injection mold compartment 14 there is effective a pressure of the injected mass of material which counteracts the constant holding force of the closure piston 9, and accordingly, has the tendency of displacing the closure piston 9 in the opposite direction. This return displacement or stroke must be only of such a magnitude that at the mold separation plane 13 there is not formed any or only a very small mold gap in order to prevent an impermissibly large formation of flash or the like at the finished molded article. With this very small return stroke or displacement of the closure piston 9 which occurs relative to the closure cylinder 6 there is also displaced the transmitter component 20 which frictionally adheres by the magnetic force at the piston neck 6. As a result, the measurement gap 27 which was previously annihilated during the closing movement of the closure piston 9 is again formed and the measurement gap 26 located at the left-hand side of the transmitter component 20 again becomes smaller, and specifically, both changes in the dimensions of the measurement gaps or spaces 26, 27 take place exactly as a function of the pressure of the mass prevailing in the molding compartment 14 and acting against the constant holding force of the closure piston 9. With the so-to-speak mirror-image arrangement of both measurement coils 24a with respect to the transmitter component 15 both measurement coils 24a participate in the formation of the measurement value. Each displacement of the transmitter component or part 20 brings about an equal size, however opposing change of the measurement gaps or spaces 26 and 27. As a result, the inductances of the coils 24a are opposingly altered and thus the measurement sensitivity is additively increased. With this pick-up of the measurement value of the measurement value transmitter A it is possible by means of a suitable regulation device to regulate the control or regulation magnitudes which influence the degree of filling of the mold, such as for instance the injection pressure, the after-pressure, the dosing volume or the setting time of the injected plastic mass.

A different arrangement of measurement value transmitter B has been shown in FIG. 1 wherein the same is located, for instance, at the extreme left-hand bottom portion or end of the closure cylinder 6. With this constructional embodiment of measurement value transmitter B a rod 28 anchored at the piston head 7 is guided through the base or bottom portion of the closure cylinder 6 and extends with its free end 28a through a housing-like transmitter component or part 29, in the side walls of which there are embedded two measurement coils 30. Within the transmitter component 29 there is provided a second transmitter component or part 32 which is suitably force-lockingly or frictionally coupled at the rod 28 by means of for instance a magnet 31. Owing to the lateral play of the second transmitter component 32 there are located in front of both measurement coils 30 two measurement gaps or spaces 33 and 34. In contrast to the previously described measurement value transmitter A, in the case of the measurement value transmitter B the transmitter component 29 carrying the measurement coils 30 is stationary and the transmitter component 32 forming the armature is movable. However, functionally considered in both exemplary embodiments there is no difference inasmuch as also here the return displacement or stroke of the closure piston 9 opposingly varies the measurement gaps or spaces 33 and 34 and thus two measurement coils 30 participate in the formation of the measurement value.

As a further exemplary embodiment of the invention there is illustrated in FIG. 1 a measurement value transmitter C in which an inductive measurement feeler 35 is mounted in such a manner in the cylinder flange 5 that such feeler when the mold is closed, forms together with the piston head 7 a measurement gap or space 36. The measurement feeler 35 thus forms the transmitter component or part, secured at the closure cylinder and the piston head 7 forms the second transmitter component connected with the closure piston. In the case of the measurement feeler 35 only one measurement coil detects the changes of the measurement gap or space 36, whereas a reference gap of a second passive coil remains constant. Since in this case only one branch of the bridge of the half-bridge is detuned or placed into imbalance, the effect upon the total measurement bridge circuit and thus the measurement sensitivity is less than with the measurement value transmitters A and B previously discussed above.

Figure 3:
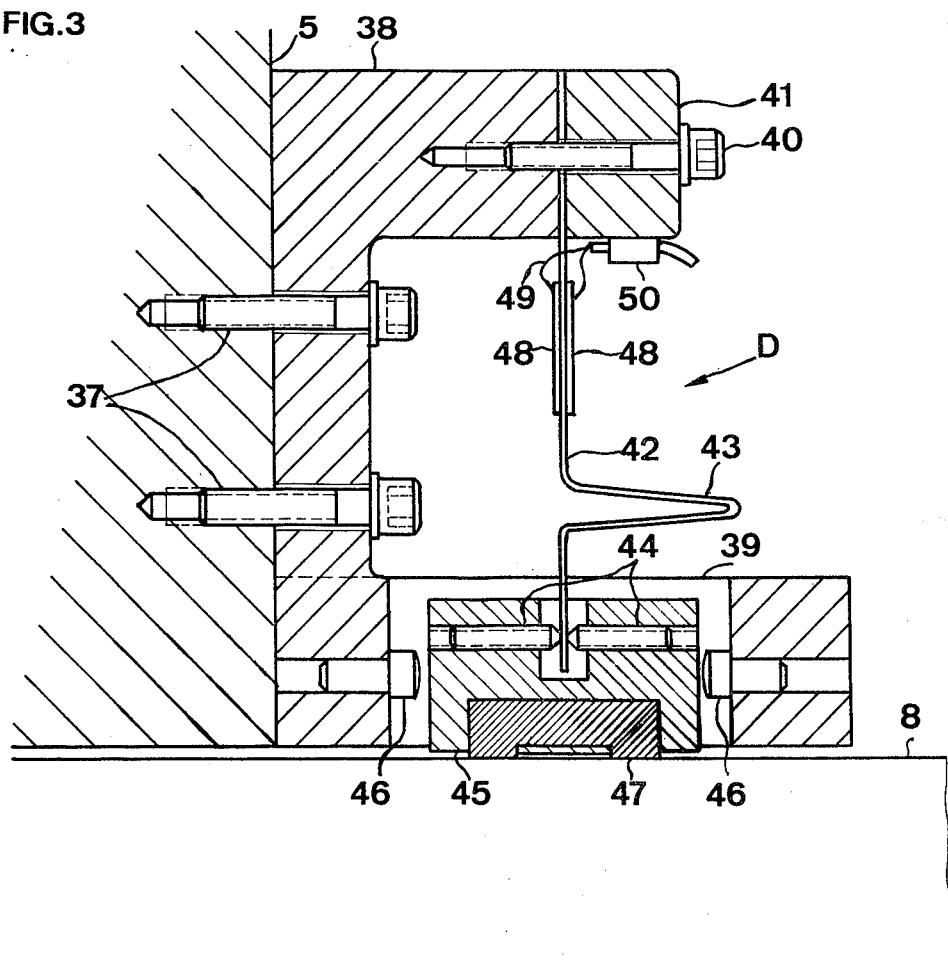

According to a still further embodiment of measurement value transmitter D as shown in FIG. 3 a transmitter component or part 38 is connected by means of screws 37 or the like at the cylinder flange 5 and which possesses an opening 39 disposed over the piston neck or rod 8. By means of a screw 40 or equivalent structure there is fixedly clamped a leaf or blade spring 42 between the transmitter component 38 and a clamping plate 41, this leaf spring 42 being bent into a loop 43 and is anchored at its other end between two pins 44 at a second transmitter component or part 45. The transmitter component 45 which is mounted in the opening 39 with lateral play between two stops or impact members 46 adheres by means of a magnet 47 or the like at the piston neck or rod 8. At the leaf spring 42 there are mounted two wire strain gauges 48 or equivalent structure which are connected via the lines or conductors 49 with a connection location or terminal 50.

With the movement of the closure piston 9 into the mold closure piston the transmitter component 45 frictionally adhering to the piston neck 8 is displaceably entrained until reaching the right-hand located stop or impact member 46. The leaf spring 42 thus experiences a small bending or deflection as a result of which there occurs between both strain gauges 48 a length- or resistance difference. With the return displacement or stroke of the closure piston 9 which occurs during the injection molding operation the transmitter component 45 is shifted towards the left as a function of the pressure of the mass which prevails in the mold compartment or cavity 14. The resistance difference of both wire strain gauges 48 which previously arose due to bending of the blade or leaf spring 42 changes in accordance with the return displacement of the transmitter component 45 and the restoring or return bending movement of the leaf spring 42. The measurement value recorded or sensed by the wire strain gauges 48 and produced due to the relative movement between the transmitter component 38 and the transmitter component 45 is delivered to a conventional measurement amplifier where the wire strain gauges likewise can be connected into a Wheatstone bridge. The loop 43 has the function of compensating the distance changes, occurring during displacement of the transmitter component 45, between the clamping locations of the leaf or blade spring 42.

All of the exemplary embodiments have common therewith the feature that the measurement value transmitter is arranged externally of the region of the mold and its neighboring components. The measurement value transmitter thus can always remain in the machine independently of any exchange or replacement operation which has to be carried out at the mold and the measurements are not exposed to disturbing influences or factors emanating from the mold.

The pressure of the mass in the mold, i.e. the degree of filling is then most reliably determinable i.e. regulatable if the relative movement between the closure piston and the closure cylinder can be measured without any foreign disturbances, for instance bending of parts of the closure device. This is especially then the case when the measurement value transmitter is arranged directly at the location where the relative movement between the closure piston and the closure cylinder directly occurs. In this regard it is advantageous to arrange a transmitter component at the cylinder flange and a second transmitter component of the measurement value transmitter at the piston neck or rod or the like.

The measurement value transmitter, during each measurement, automatically selects a basic or starting position when a transmitter component of the measurement value transmitter is coupled in the manner of a drag connection in a limited range of movement with the closure piston in a force-locking or frictionally connected manner and loses the force-locking or frictional-connection with the closure piston by impacting at a second transmitter component. The measurement apparatus of this development is also usable in the case of hydraulic-mechanical closure devices, for instance in the case of combinations employing toggle lever-systems or the like.

While there are shown and described present preferred embodiments of the invention, it is to be distinctly understood that the invention is not limited thereto, but may be otherwise variously embodied and practiced within the scope of the following claims.
ACCORDINGLY,
What is claimed is:

1. A measurement apparatus for a molding machine for controlling the degree of filling of a molding mass filled under pressure into a molding compartment thereof, comprisingan electrical measurement value transmitter including sensing means responsive to changes in distance for determining the degree of filling of a mold having a molding compartment, said mold comprising two mold parts movable between a mold closure positin and a mold open position, at least one fluid-operated displacement means moving the mold parts against one another into the mold closure position, said fluid-operated displacement means comprising a closure cylinder and a closure piston cooperating with said mold, said measurement value transmitter comprising a first transmitter component and a second transmitter component, the first transmitter component being secured to the closure cylinder and the second transmitter component being coupled to allow relative movement with the closure piston, means providing a drag connection between the second transmitter component and the closure piston throughout a given range of movement of said closure piston, and during movement of said closure piston within said given range of movement said drag connection having means effective to allow relative movement between said first transmitter component and said second transmitter component and no relative movement between said second transmitter component and said closure piston, and when said closure piston has moved outside of said given range of movement said transmitter components being arranged so that said drag connection is rendered ineffective, said closure piston and said second transmitter component being coupled to allow relative movement and said first transmitter component and said second transmitter component having no relative movement therebetween.

2. The measurement apparatus as defined in claim 1, wherein the fluid-operated displacement means comprises a hydraulic displacement device.

3. The measurement apparatus as defined in claim 1, wherein said drag connection means is carried by the second transmitter component and provides a force-locking connection of the second transmitter component with the closure piston.

4. The measurement apparatus as defined in claim 3, including stop means cooperating with the second transmitter component for limiting the movement of the second transmitter component relative to the first transmitter component.

5. The measurement apparatus as defined in claim 1, wherein said drag connection means comprises a permanent magnet carried by the second transmitter component for coupling the second transmitter component with the closure piston.

6. The measurement apparatus as defined in claim 5, wherein the closure piston includes a piston neck, the second transmitter component being coupled with the piston neck by means of said permanent magnet.

7. The measurement apparatus as defined in claim 1, wherein one transmitter component is constructed as an inductive measurement feeler and the other transmitter component is constructed as an armature, and wherein between the measurement feeler and the armature there is provided at least one measurement gap.

8. The measurement apparatus as defined in claim 1, wherein one of the transmitter components is provided with a recess, the other transmitter component being arranged within the recess of said one transmitter component, and two measurement coils are arranged so as to provide a respective measurement gap.

9. The measurement apparatus as defined in claim 1, wherein the first transmitter component is secured to the closure cylinder and the second transmitter component is connected via a rod in a force-locking manner with the closure piston.

10. The measurement apparatus as defined in claim 1, wherein a blade spring is spanned between the first transmitter component and the second transmitter component, and strain gauges are arranged at said blade spring.

11. The measurement apparatus as defined in claim 1, wherein the closure cylinder includes a cylinder flange, the first transmitter component comprises a measurement feeler mounted at the cylinder flange, said closure piston including a piston head defining the second transmitter component and wherein when the mold is closed the first transmitter component comprising said measurement feeler forms a measurement gap with the piston head which defines said second transmitter component.

* * * * *